(12) United States Patent
Ju

(10) Patent No.: US 6,970,338 B2
(45) Date of Patent: Nov. 29, 2005

(54) POWER SUPPLY DEVICE HAVING OVERCURRENT PROTECTION FUNCTION AND METHOD FOR CONTROLLING THE SAME

(75) Inventor: Beom Jun Ju, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/703,606

(22) Filed: Nov. 10, 2003

(65) Prior Publication Data

US 2004/0201936 A1 Oct. 14, 2004

(30) Foreign Application Priority Data

Apr. 9, 2003 (KR) .............................. 10-2003-0022368

(51) Int. Cl.[7] .............................................. H02H 9/00
(52) U.S. Cl. ...................................................... 361/58
(58) Field of Search .............................. 361/93, 9, 18, 361/93.1, 58

(56) References Cited

U.S. PATENT DOCUMENTS 5,986,442 A * 11/1999 Abe et al. .................. 323/283

FOREIGN PATENT DOCUMENTS

JP 8-317545 11/1996 ............ H02H/3/24

* cited by examiner

*Primary Examiner*—Ronald Leja
(74) *Attorney, Agent, or Firm*—Greenblum & Bernstein, P.L.C.

(57) ABSTRACT

By using a plurality of diodes and resistors, an overcurrent protector is implemented in a power supply device that supplies drive power to a peripheral device. The overcurrent protector blocks drive power from a power supply source from being supplied to the peripheral device when an overcurrent is applied from the power supply device to the peripheral device. The diodes and resistors are incorporated into the power supply device to form the circuit thereof. Since the power supply device is not added with a separate circuit for preventing an overcurrent from being applied to the peripheral device, there is no increase in the cost due to additional parts used for implementing the separate circuit. Since a smaller number of parts are used to implement the overcurrent protector, it is easy to design the device, while preventing a decrease in the reliability due to errors in the additional parts.

7 Claims, 6 Drawing Sheets

POWER SUPPLY DEVICE HAVING OVERCURRENT PROTECTION FUNCTION AND METHOD FOR CONTROLLING THE SAME

RELATED APPLICATIONS

The present disclosure relates to subject matter contained in Korean Application No. 10-2003-22368, filed on Apr. 9, 2003, which is herein expressly incorporated by reference in its entirety.

BACKGROUND OF THE INVENTION

1. Field of the Invention

The present invention relates to a power supply device having an overcurrent protection function, and more particularly to a power supply device for supplying drive power to an external peripheral device, which has an overcurrent protection function for blocking drive power from being supplied from the power supply device to the peripheral device when an overcurrent is applied to the peripheral device, thereby preventing in advance the power supply device and the peripheral device from being damaged by the overcurrent.

2. Description of the Related Art

As shown in FIG. 1, a first conventional power supply device includes a power supplier 10, a power interrupter 20 and a microcomputer 30. The power supplier 10 supplies drive power to an external peripheral device. The power interrupter 20 turns the power supplier 10 on/off to determine whether to supply drive power to the peripheral device. The microcomputer 30 is connected to the power interrupter 20 to generate a control signal for turning the power interrupter 20 on/off.

The power supply device further includes a power supply source 40 and a power output terminal 50. The power supply source 40 supplies the drive power to the power supplier 10. The power output terminal 50 is connected to the peripheral device so as to allow the drive power passing through the power supplier 10 to be supplied to the peripheral device.

The power supplier 10 includes a first transistor Q1 and a resistor R1. The first transistor Q1 has its emitter connected to the power supply source 40 and its collector connected to the power output terminal 50. The resistor R1 is connected between the emitter and the base of the first transistor Q1.

The power interrupter 30 includes a second transistor Q2 and a resistor R3. The transistor Q2 has its collector connected to the base of the first transistor Q1 through a resistor R2. The resistor R3 is connected between the base and the emitter of the second transistor Q2. The base of the second transistor Q2 is connected to the microcomputer 30 through a resistor R4.

The conventional power supply device having such a configuration operates in the following manner.

First, the microcomputer 30 generates a control signal for controlling the power interrupter 20, and the generated control signal is inputted to the base of the second transistor Q2, thereby turning the second transistor Q2 on.

As the second transistor Q2 is turned on, the first transistor Q1 of the power supplier 10 is turned on. Accordingly, the drive power supplied from the power supply source 40 is transferred to the power output terminal 50 through the first transistor Q1, which is thus supplied through the power output terminal 50 to an external peripheral device connected to the terminal 50.

However, since it has no function to prevent an overcurrent from being applied to the peripheral device, the conventional power supply device has a problem in that the overcurrent may damage not only the peripheral device but also the power supply device.

A device for preventing the overcurrent has been proposed in Japanese Patent Publication No. 1996-317545, which is shown in FIG. 2. In this device, the magnitude of a voltage applied to a second transistor 62 is measured based on the respective resistances of first and second resistors 71 and 72, provided in a resistor portion 70 connected in parallel to first and second transistors 61 and 62, and two resistors 63 and 64 in power switching means 60. A controller 80 turns the second transistor 62 off if the measured magnitude is equal to or more than a predetermined level.

In this manner, a separate circuit (or controller) may be used to block drive power supplied from a power supply device from being transferred to a peripheral device when an overcurrent is applied to the peripheral device, so as to prevent the overcurrent from being applied to the peripheral device. However, the necessity to provide additional parts for forming the separate circuit leads to an increase in the cost, and also decreases the reliability due to errors in the additional parts.

SUMMARY OF THE INVENTION

Therefore, the present invention has been made in view of the above problems, and it is an object of the present invention to provide a power supply device having an overcurrent protection function and a method for controlling the same, which does not use a separate circuit in order to prevent an overcurrent from being applied to an external peripheral device connected to the power supply device, but allows a transistor, power switching means, in the power supply device to be turned off when a voltage of more than a predetermined level is applied to the transistor, thereby protecting the transistor in a simple way and also making it easy to design the circuit.

In accordance with one aspect of the present invention, the above and other objects can be accomplished by the provision of a power supply device having an overcurrent protection function, comprising: a power supplier, connected to an external peripheral device, for supplying drive power to the peripheral device; a power interrupter for turning the power supplier on/off to determine whether to supply the driver power to the peripheral device; a microcomputer, connected to the power interrupter, for generating a control signal to turn the power interrupter on/off; and an overcurrent protector for turning the power supplier off when an overcurrent is applied to the peripheral device.

In accordance with another aspect of the present invention, there is provided a method for controlling a power supply device, comprising the steps of: a) allowing a microcomputer to generate an ON/OFF control signal for turning a power supplier on/off, said power supplier being connected to an external peripheral device to supply drive power to the peripheral device; b) allowing drive voltage to be applied to a power interrupter, said power interrupter turning the power supplier on when an ON control signal is applied at said step a) and thus determining whether to supply drive power to the peripheral device; and c) allowing the power supplier to be turned off as the power interrupter is turned off, in the case where the output terminal of the power supplier is shorted.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
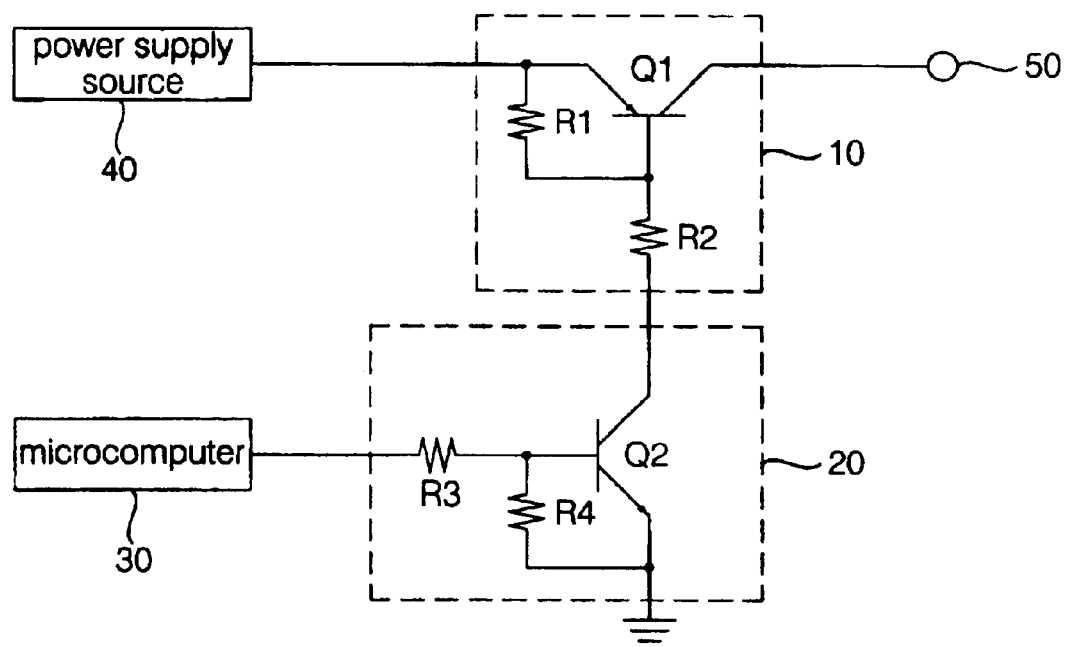
FIG. 1 shows one example of a power supply device in the prior art.
Figure 2:
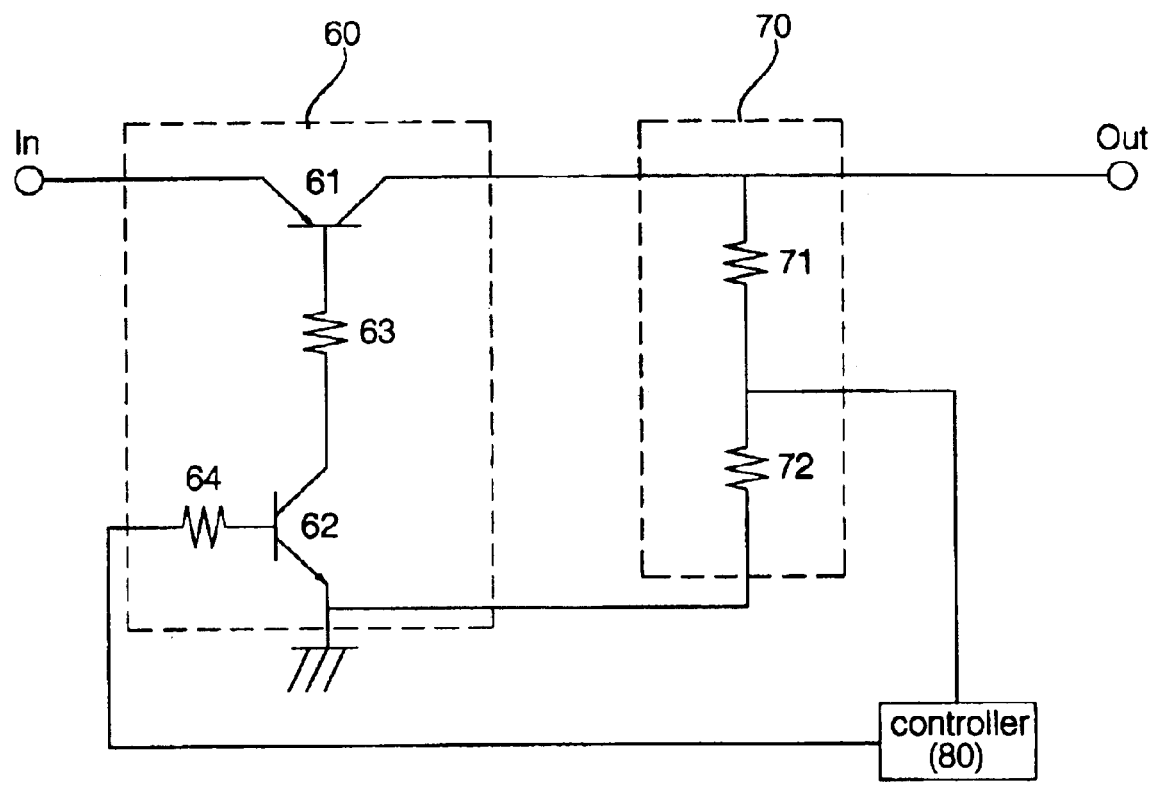
FIG. 2 shows another example of a power supply device in the prior art.
Figure 3:
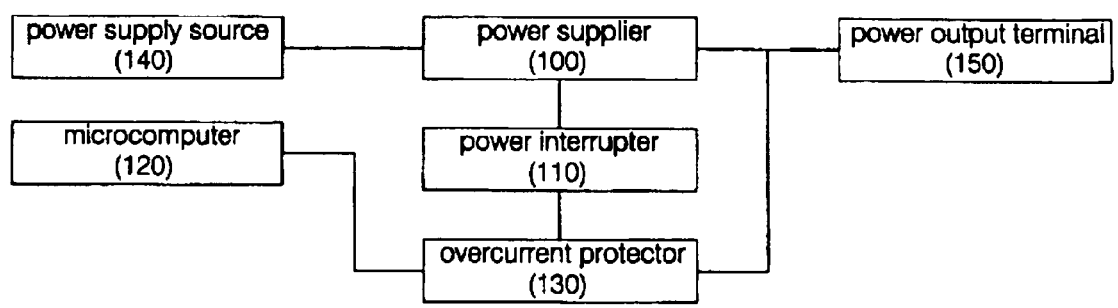
FIG. 3 is a block diagram showing a power supply device having an overcurrent protection function according to the present invention.
Figure 4:
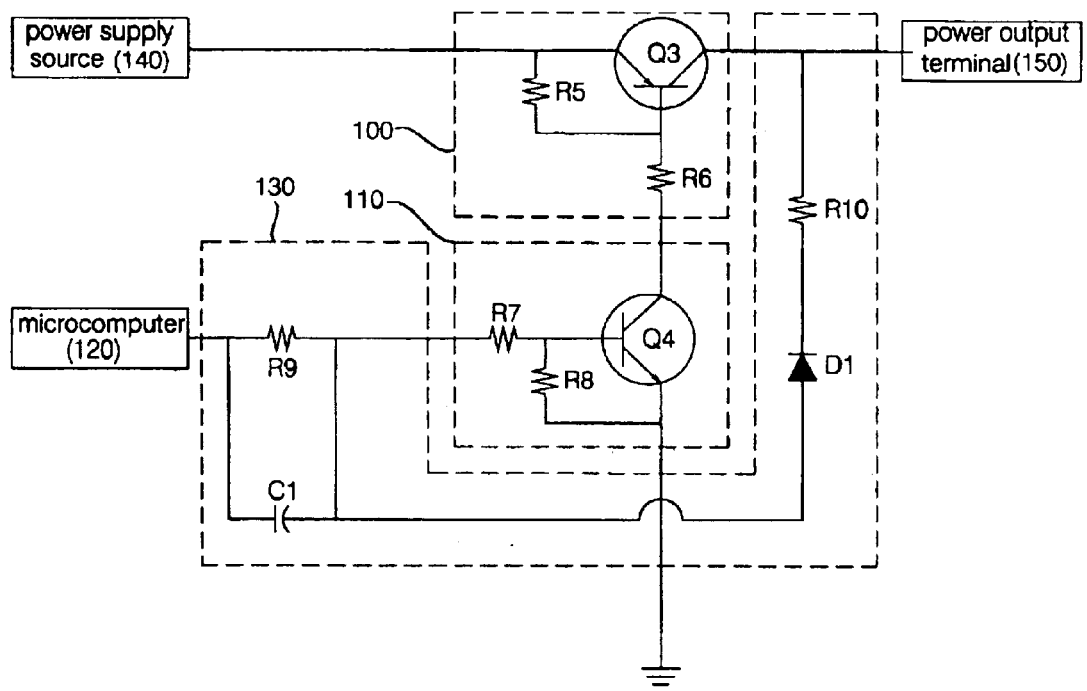
FIG. 4 is a circuit diagram showing the configuration of a power supplier, a power interrupter and a power protector shown in FIG. 3, according to a first embodiment of the present invention.
Figure 5:
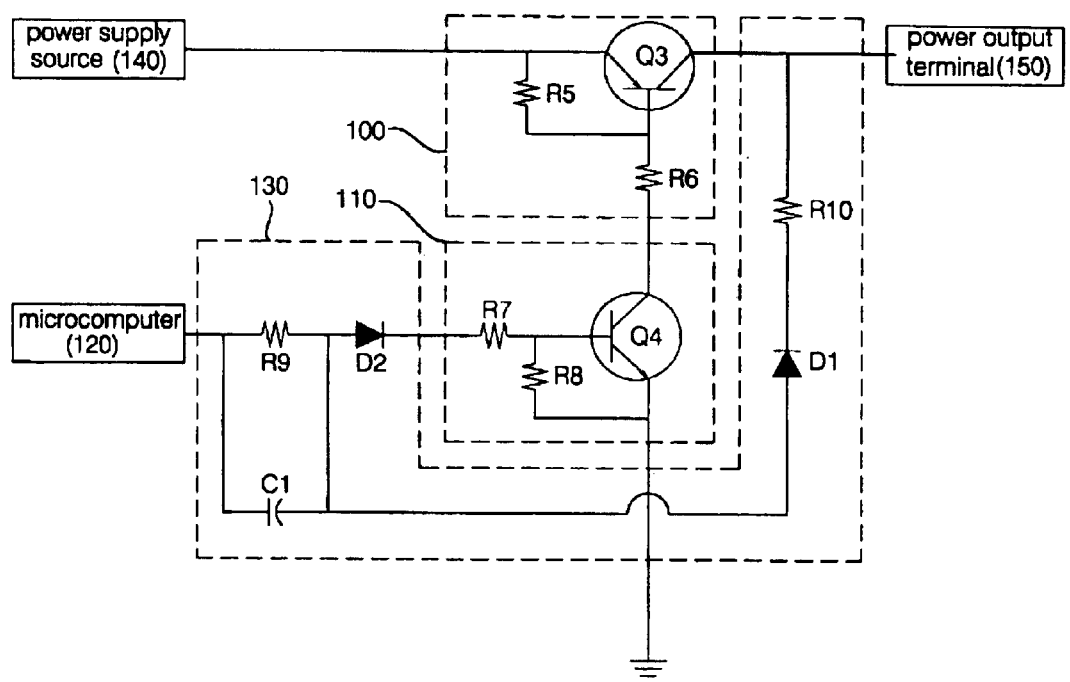
FIG. 5 is a circuit diagram showing the configuration of a power supplier, a power interrupter and a power protector shown in FIG. 3, according to a second embodiment of the present invention.

As shown in FIGS. 3, 4 and 5, a power supply device having an overcurrent protection function according to the present invention includes a power supplier 100, a power interrupter 110, a microcomputer 120 and an overcurrent protector 130. The power supplier 100 is connected to an external peripheral device to supply drive power to the peripheral device. The power interrupter 110 turns the power supplier 100 on/off to determine whether to supply the drive power to the peripheral device. The microcomputer 120 is connected to the power interrupter 110 to generate a control signal for turning on/off the power interrupter 110. Separately from the control signal generated from the microcomputer 120, the overcurrent protector 130 allows the power interrupter 110 to be turned on/off when an overcurrent is applied from the power supplier 100 to the peripheral device.

The power supply device further includes a power supply source 140 and a power output terminal 150. The power supply source 140 supplies the drive power to the power supplier 100. The power output terminal 150 is connected to the peripheral device to allow the drive power passing through the power supplier 100 to be supplied to the peripheral device.

The power supplier 100 includes a first transistor Q3 and a resistor R5, as shown in FIG. 4. The first transistor Q3 has its emitter connected to the power supply source 140, and its collector connected to the power output terminal 150. The resistor R5 is connected between the emitter and the base of the first transistor Q3. The power interrupter 110 includes a second transistor Q6 and a resistor R8. The second transistor Q6 has its collector connected to the base of the first transistor Q3 through a resistor R6. The resistor R8 is connected between the base and the emitter of the second transistor Q6.

According to a first embodiment of the present invention, the overcurrent protector 130 includes a first resistor R9, a capacitor C1, a first diode D1 and a second resistor R10, as shown in FIG. 4. The first resistor R9 is connected between the microcomputer 120 and a resistor R7 connected to the base of the second transistor Q4. The capacitor C1 is connected between the first resistor R9 and the microcomputer 120, and connected in parallel to the first resistor R9. The first diode D1 has its anode connected to the capacitor C1. The second resistor R10 is connected to the cathode of the first diode D1 and also connected to the collector of the first transistor Q3.

A description will now be given of the operation of the power supply device having an overcurrent protection function according to the present invention, which is configured as described above.

First, in the case where drive power is supplied to an external peripheral device, the microcomputer 120 generates a control signal, and the generated control signal is inputted to the base of the second transistor Q4 in the power interrupter 110.

At this time, in order to allow the control signal to turn the second transistor Q4 on at the initial time, the capacitor C1 in the overcurrent protector 130 instantaneously forms a short circuit and then returns to an insulating state. This is because it is required to apply drive voltage for driving the second transistor Q4 at the initial time, in the case where a low load (for example, a vehicle battery, or a load of about 28Ω at 500 mA) is connected to the power output terminal 150.

As the control signal allows the second transistor Q4 to be turned on, the first transistor Q3 in the power supplier 100 is turned on. Accordingly, drive power supplied from the power supply source 140 is outputted through the power output terminal 150 after passing through the first transistor Q3, so as to be supplied to the external peripheral device. During this procedure, the first diode D1 is in the off state.

On the other hand, in the case where an overcurrent is applied to the peripheral device, i.e., when a load of lower resistance is connected to the power output terminal 150 or it is shorted, a current flowing through the first diode D1 and the second resistor R10 increases. Thus, an overcurrent larger than the normal current flows in the overcurrent protector 130.

In this case, as it divides according to the ratio of the respective resistances of the first and second resistors R9 and R10, a current inputted to the base of the second transistor Q4 in the power interrupter 110 decreases, thereby turning the second transistor Q4 off. For example, when the first resistor R9 has a resistance of 10KΩ, and the second resistor R10 has a resistance of 1KΩ, a voltage of 1/11th of the total value is applied to the resistor R7 in the power interrupter 110, so that the second transistor Q4 is turned off. Accordingly, the resistance of the first resistor R9 is set to be higher than that of the second resistor R10.

In addition, as the second transistor Q4 is turned off, the first transistor Q3 is also turned off, thereby blocking the power supplied from the power supply source 140 from being transferred to the peripheral device. This makes it possible to prevent in advance both the peripheral device and the power supply device from being damaged by the overcurrent.

According to a second embodiment of the present invention, the overcurrent protector 130 further includes a second diode D2 connected between the first resistor R9 and the power interrupter 110, as shown in FIG. 5. When an overcurrent is applied to the peripheral device, it causes a decrease in the voltage of the first diode D1. The second diode D2 functions to offset the voltage decrease.

Figure 6:
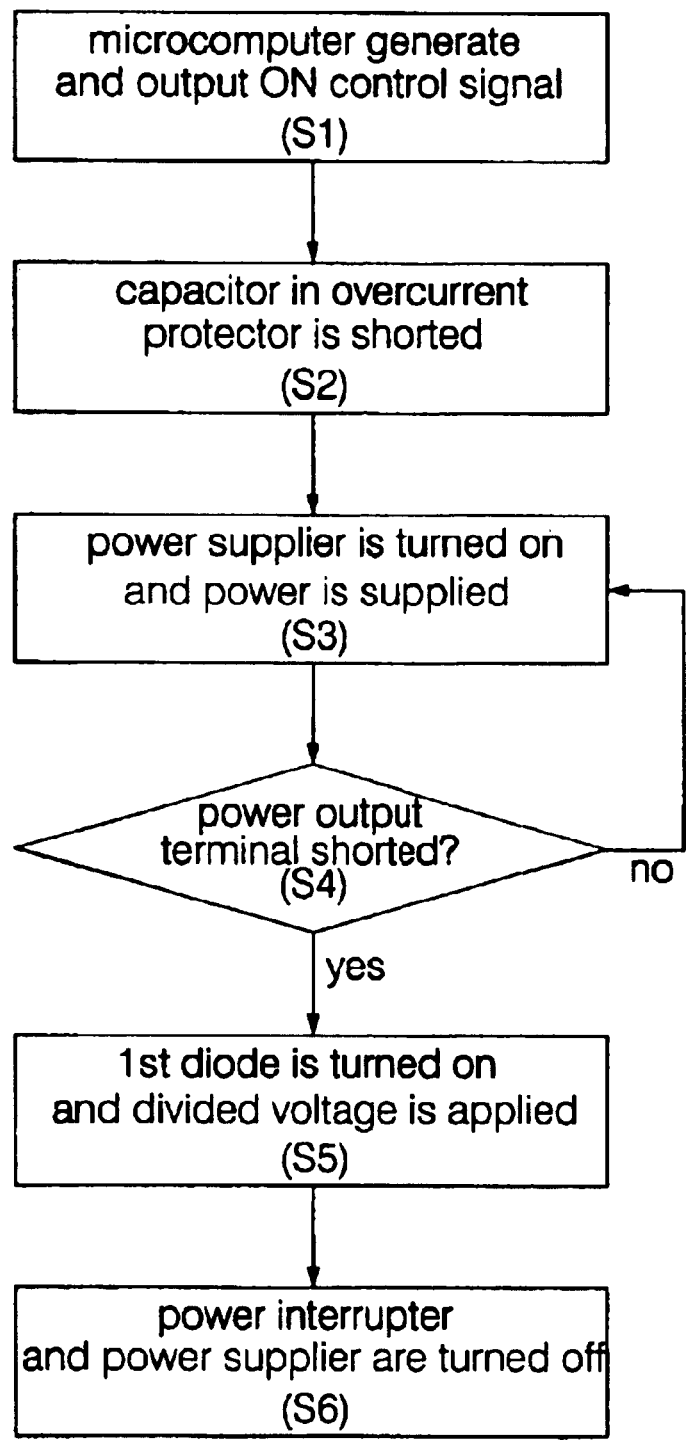
FIG. 6 is a flowchart showing the procedure of a method for controlling a power supply device having an overcurrent protection function, according to the present invention.

A description will now be given of a method for controlling the power supply device according to the present invention, with reference to FIG. 6.

At a first step, the microcomputer 120 generates and outputs an ON control signal to allow the power supplier 100 to be turned on (S1).

As the ON control signal is generated and outputted, the capacitor C1 in the overcurrent protector 130 is shorted at a second step, so that drive voltage is applied to the second transistor Q4 in the power interrupter 110 (S2).

As the second transistor Q4 is turned on, the first transistor Q3 is turned on at a third step, so that the power supplier 100 transfers power supplied from the power supply source 140 to the power output terminal 150 (S3).

If the power output terminal 150 is shorted at a fourth step while the first transistor Q3 in the power supplier 100 is turned on, the first diode D1 is turned on at a fifth step, so that the power interrupter 110 is applied with a voltage divided according to the ratio of the respective resistances of the first and second resistors R9 and R10 (S4 and S5).

When the divided voltage is applied to the power interrupter 110, the second transistor Q4 is turned off, whereby the first transistor Q3 is turned off at a sixth step, consequently blocking power from being transferred to the power output terminal 150 (S6).

If the power output terminal 150 is not shorted and thus no overcurrent is applied to the overcurrent protector 130, the power interrupter 110 and the power supplier 100 are continuously kept on, so that the power is continuously supplied to the power output terminal 150.

As apparent from the above description, a power supply device having an overcurrent protection function and a method for controlling the same according to the present invention have the following features and advantages. By using a plurality of diodes and resistors, an overcurrent protector is implemented in a power supply device that supplies drive power to a peripheral device. The overcurrent protector functions to block drive power supplied from a power supply source from being transferred to a peripheral device when an overcurrent is applied from the power supply device to the peripheral device. The diodes and resistors are incorporated into the power supply device to form a circuit thereof. Since the power supply device is not added with a separate circuit for preventing an overcurrent from being applied to the peripheral device, there is no increase in the cost due to additional parts used for implementing the separate circuit. In addition, since a smaller number of parts are used to implement the overcurrent protector, it is easy to design the device, and it is also possible to prevent a decrease in the reliability due to errors in the additional parts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply device having an overcurrent protection function, comprising:
   a power supplier, connected to an external peripheral device, for supplying drive power to the peripheral device;
   a power interrupter for turning the power supplier on/off to determine whether to supply the driver power to the peripheral device;
   a microcomputer, connected to the power interrupter, for generating a control signal to turn the power interrupter on/off; and
   an overcurrent protector for turning the power supplier off when an overcurrent is applied to the peripheral device, wherein the overcurrent protector includes;
      a first resistor connected in series between the microcomputer and the power interrupter;
      a second resistor having one end connected to both the first resistor and an input terminal of the power interrupter and the other end connected to an output terminal of the power supplier, whereby a voltage according to the ratio of respective resistances of the first and second resistors is applied to a switching device of the power interrupter; and
      a first diode connected in series between the second resistor and the first resistor.

2. The power supply device according to claim 1, wherein the power supplier includes a first transistor having an emitter and a collector, said emitter being connected to a power supply terminal through which the drive power is supplied, said collector being connected to the peripheral device, and the power interrupter includes a second transistor having a collector connected to a base of the first transistor.

3. The power supply device according to claim 2, wherein the voltage according to the ratio of respective resistances of the first and second resistors is applied to the second transistor in the power interrupter.

4. The power supply device according to claim 3, wherein the overcurrent protector further includes a capacitor connected in parallel with the first resistor to allow drive voltage to be applied to the second transistor in the power interrupter when an ON control signal is applied from the microcomputer.

5. The power supply device according to claim 4, wherein the overcurrent protector further includes a second diode connected in series to both the input terminal of the power interrupter and the first resistor so as to offset a voltage applied to the first diode.

6. A method for controlling a power supply device, comprising:
   allowing a microcomputer to generate an ON/OFF control signal for turning a power supplier on/off, said power supplier being connected to an external peripheral device to supply drive power to the peripheral device;
   allowing a drive voltage to be applied to a power interrupter, said power interrupter turning the power supplier on when an ON control signal is applied and thus determining whether to supply drive power to the peripheral device; and
   providing an over-current protector that allows the power supplier to be turned off as the power interrupter is turned off, in the case where the output terminal of the power supplier is shorted, the over-current protector including a first resistor connected in series between the microcomputer and the power interrupter, a second resistor having a first terminal connected to both the first resistor and an input terminal of the power interrupter and a second terminal connected to an output terminal of the power supplier, such that a voltage according to a ratio of respective resistances of the first and second resistors is applied to a switching device of the power interrupter, and a first diode that is connected in series between the second resistor and the first resistor.

7. The method according to claim 6, wherein the providing an over-current protector that allows the power supplier to be turned off includes:

allowing a voltage according to the ratio of respective resistances of the first and second resistors connected with the power interrupter to be applied to the power interrupter when the output terminal is shorted;

allowing the power interrupter to be turned off when the voltage applied at said allowing a voltage is equal to or less than a voltage applied before the output terminal of the power supplier is shorted; and allowing the power supplier to be turned off as the power interrupter is turned off.

* * * * *